US011373052B2

(12) United States Patent
Zhu (10) Patent No.: US 11,373,052 B2
(45) Date of Patent: Jun. 28, 2022

(54) DATA INTERACTION METHOD AND DEVICE, STORAGE MEDIUM, AND MOBILE TERMINAL

(71) Applicant: Gree Electric Appliances, Inc. of Zhuhai, Guangdong (CN)

(72) Inventor: Dan Zhu, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 17/040,118

(22) PCT Filed: Dec. 17, 2018

(86) PCT No.: PCT/CN2018/121541
§ 371 (c)(1),
(2) Date: Sep. 22, 2020

(87) PCT Pub. No.: WO2019/214238
PCT Pub. Date: Nov. 14, 2019

(65) Prior Publication Data
US 2021/0027032 A1    Jan. 28, 2021

(30) Foreign Application Priority Data

May 10, 2018 (CN) .......................... 201810442983.2

(51) Int. Cl.
*G06F 3/0486* (2013.01)
*G06K 7/14* (2006.01)
(Continued)

(52) U.S. Cl.
CPC ......... *G06K 7/1417* (2013.01); *G06F 3/0486* (2013.01); *G06F 3/04883* (2013.01); *H04N 7/18* (2013.01)

(58) Field of Classification Search
CPC ......... G06K 9/00664; G06K 19/06028; G06K 7/1417; G06Q 20/12; G06Q 20/322;
(Continued)

(56) References Cited

U.S. PATENT DOCUMENTS

2016/0078143 A1* 3/2016 Huang ................. G06K 7/1404 235/375
2017/0344994 A1* 11/2017 Wang ..................... G06Q 50/01
2021/0056535 A1* 2/2021 Xu .......................... H04L 67/20

FOREIGN PATENT DOCUMENTS

| CN | 106875181 A | 6/2017 |
| CN | 106875191 A | 6/2017 |

(Continued)

OTHER PUBLICATIONS

Chen Xiaoxiang, "CN 106875181—Code scanning payment processing method and mobile terminal", Jun. 20, 2017, pp. 1-10 (Year: 2017).*

(Continued)

*Primary Examiner* — Tam T Tran
(74) *Attorney, Agent, or Firm* — McAndrews, Held & Malloy, Ltd.

(57) ABSTRACT

Provided are a data interaction method and device, a storage medium, and a mobile terminal. The data interaction method is used for a mobile terminal. The mobile terminal includes dual cameras. The method includes that: one of two interactive identification codes appearing in the current photography range of the dual cameras is scanned separately by means of two cameras included in the dual cameras (S110);

(Continued)

a data interaction page obtaining request is sent to different data interaction platforms corresponding to the two interactive identification codes according to the two interactive identification codes separately scanned by the two cameras (S120); data interaction pages, which are returned by the different data interaction platforms corresponding to the two interactive identification codes according to the data interaction page obtaining request, are received (S130); and a first data interaction page firstly received in the returned data interaction pages is displayed so that a user performs corresponding data interaction on the first data interaction page (S140).

19 Claims, 4 Drawing Sheets (51) Int. Cl.
*G06F 3/04883* (2022.01)
*H04N 7/18* (2006.01)

(58) Field of Classification Search
CPC .............. G06Q 20/3223; G06F 3/0486; G06F 3/04883; H04N 7/18
See application file for complete search history.

(56) References Cited

FOREIGN PATENT DOCUMENTS

| CN | 107248072 A | 10/2017 |
|---|---|---|
| CN | 107506999 A | 12/2017 |
| CN | 108711048 A | 10/2018 |
| WO | 2017173749 A1 | 10/2017 |

OTHER PUBLICATIONS

Zhang Yuxi et al., CN 107248072—Code scanning method, mobile terminal and computer readable storage medium, Oct. 13, 2017, pp. 1-9 (Year: 2017).*
Wen-Chuan Wu, A QR Code-Based on-Street Parking Fee Payment Mechanism, Aug. 1, 2014, IEEE Computer Society, pp. 106-109 (Year: 2014).*
Taolin MA et al., The Design and Implementation of an Innovative Mobile Payment System Based on QR Bar Code, Jan. 1, 2015, IEEE Xplore—Conference Publishing Services, pp. 435-440 (Year: 2015).*
International Search Report, dated Mar. 18, 2019, in International application No. PCT/CN2018/121541, filed on Dec. 17, 2018.
Chinese priority application supplemental search report for CN 2018104429832 (2 pages).

* cited by examiner

DATA INTERACTION METHOD AND DEVICE, STORAGE MEDIUM, AND MOBILE TERMINAL

CROSS-REFERENCE TO RELATED APPLICATIONS

This application is a 371 of International Patent Application No. PCT/CN2018/121541, filed Dec. 17, 2018, which claims priority to Chinese Patent Application No. 201810442983.2, filed on May 10, 2018 and entitled "Data Interaction Method and Device, Storage Medium, and Mobile Terminal", the disclosures of both of which are hereby incorporated by reference in their entirety.

TECHNICAL FIELD

The present disclosure relates to the field of data interaction, in particular to a data interaction method and device, a storage medium, and a mobile terminal.

BACKGROUND

In recent years, mobile data interaction applications have become more and more popular. Taking mobile payment APP as an example, most merchants can provide a QR code for users to scan and pay. The merchants generally provide the QR codes on different payment platforms for users to scan and pay, for example, the QR codes of Alipay and WeChat are provided side by side, so that customers can choose any one of them to scan and pay. However, when using the QR code of any payment platform for payment, the users have to open the corresponding client (APP) installed on the mobile terminal (such as a mobile phone) for scanning, which is very inconvenient and time-consuming, and is bad in user experience.

SUMMARY

Embodiments of the present disclosure provide a data interaction method used for a mobile terminal, the mobile terminal including dual cameras. The method may include the following operations. One of two interactive identification codes appearing in the current photography range of the dual cameras is scanned separately by means of two cameras included in the dual cameras, the two interactive identification code respectively corresponding to different data interaction platforms. A data interaction page obtaining request is simultaneously sent to different data interaction platforms corresponding to the two interactive identification codes according to the two interactive identification codes separately scanned by the two cameras. Data interaction pages, which are returned by the different data interaction platforms corresponding to the two interactive identification codes according to the data interaction page obtaining request, are received. A first data interaction page firstly received in the returned data interaction pages is displayed so that a user performs corresponding data interaction on the first data interaction page.

Optionally, the operation that the data interaction pages, which are returned by the different data interaction platforms corresponding to the two interactive identification codes according to the data interaction page obtaining request, are received may include that: after the first data interaction page returned by any one of the different data interaction platforms corresponding to the two interactive identification codes is received, a second data interaction page returned by another of the different data interaction platforms corresponding to the two interactive identification codes is no longer received.

Optionally, the operation that the first data interaction page firstly received in the returned data interaction pages is displayed may include that: after the first data interaction page firstly received in the returned data interaction pages is displayed, the second data interaction page received later in the returned data interaction pages is no longer displayed.

Optionally, the operation that one of the two interactive identification codes appearing in the current photography range of the dual cameras is separately scanned by means of the two cameras included in the dual cameras may include that: the two cameras are made to scan an image in the current photography range from different directions, so that the two cameras can scan different interactive identification codes in the two interactive identification codes.

Optionally, the operation that one of the two interactive identification codes appearing in the current photography range of the dual cameras is separately scanned by means of the two cameras included in the dual cameras may include that: scanning boxes corresponding to the two cameras are separately displayed on a touch screen of the mobile terminal; a touch and drag operation performed on the touch screen by a user to the scanning box corresponding to at least one of the two cameras is received; and after the touch and drag operation stops, the interactive identification code appearing in the scanning box is scanned through the corresponding camera.

Optionally, the method may further include that: an interaction success voucher indicating that the user has completed the corresponding data interaction, which is returned by the data interaction platform the first data interaction page belongs to, is received and the interaction success voucher is displayed.

Embodiments of the present disclosure provide a data interaction device used for a mobile terminal, the mobile terminal including the dual cameras. The device includes: a scanning unit, configured to separately scan one of the two interactive identification codes appearing in the current photography range of the dual cameras by means of the two cameras included in the dual cameras, the two interactive identification code respectively corresponding to different data interaction platforms; a sending unit, configured to send the data interaction page obtaining request to the different data interaction platforms corresponding to the two interactive identification codes according to the two interactive identification codes separately scanned by the two cameras; a receiving unit, configured to receive the data interaction pages, which are returned by the different data interaction platforms corresponding to the two interactive identification codes according to the data interaction page obtaining request; and a displaying unit, configured to display the first data interaction page firstly received in the returned data interaction pages, so that the user performs the corresponding data interaction on the first data interaction page.

Optionally, the operation that the receiving unit receives the data interaction pages, which are returned by the different data interaction platforms corresponding to the two interactive identification codes according to the data interaction page obtaining request, may include that: after the first data interaction page returned by any one of the different data interaction platforms corresponding to the two interactive identification codes is received, the second data interaction page returned by another of the different data interaction platforms corresponding to the two interactive identification codes is no longer received.

Optionally, the operation that the displaying unit displays the first data interaction page firstly received in the returned data interaction pages may include that: after the first data interaction page firstly received in the returned data interaction pages is displayed, the second data interaction page received later in the returned data interaction pages is no longer displayed.

Optionally, the operation that the scanning unit separately scans one of the two interactive identification codes appearing in the current photography range of the dual cameras by means of the two cameras included in the dual cameras may include that: the two cameras are made to scan the image in the current photography range from different directions, so that the two cameras can scan different interactive identification codes in the two interactive identification codes.

Optionally, the operation that the scanning unit separately scans one of the two interactive identification codes appearing in the current photography range of the dual cameras by means of the two cameras included in the dual cameras may include that: the scanning boxes corresponding to the two cameras are separately displayed on the touch screen of the mobile terminal; the touch and drag operation performed on the touch screen by the user to the scanning box corresponding to at least one of the two cameras is received; and after the touch and drag operation stops, the interactive identification code appearing in the scanning box is scanned through the corresponding camera.

Optionally, the device may further include: a voucher receiving unit, configured to receive the interaction success voucher indicating that the user has completed the corresponding data interaction, which is returned by the data interaction platform the first data interaction page belongs to; and a displaying unit, configured to display the interaction success voucher received by the voucher receiving unit.

Yet embodiments of the present disclosure provide a storage medium, storing a computer program thereon. When executed by a processor, the program implements steps of any above method.

Yet embodiments of the present disclosure provide a mobile terminal, which includes a processor, a memory, and a computer program stored on the memory and capable of running on the processor. When executing the program, the processor implements steps of any above method.

Yet embodiments of the present disclosure provide a mobile terminal, which includes any above data interaction device.

BRIEF DESCRIPTION OF THE DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings.

DETAILED DESCRIPTION OF THE EMBODIMENTS

In order to make the purpose, technical solutions and advantages of the present disclosure clearer, the technical solutions of the present disclosure will be described below clearly and completely in combination with the specific embodiments of the present disclosure and the corresponding drawings. It is apparent that the described embodiments are only a part of the embodiments of the present disclosure but not all. On the basis of the embodiments of the present disclosure, all other embodiments obtained on the premise of no creative work of those skilled in the art fall within the protection scope of the present disclosure.

It is to be noted that the terms like "first" and "second" in the specification, claims and accompanying drawings of the present disclosure are used for differentiating the similar objects, but do not have to describe a specific order or a sequence. It should be understood that the objects may be exchanged under appropriate circumstances, so that the embodiments of the present disclosure described here may be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The present disclosure provides a data interaction method. The method may be used for a mobile terminal. The mobile terminal includes dual cameras. The mobile terminal may be, for example, a mobile phone, a tablet PC, etc.

Figure 1:
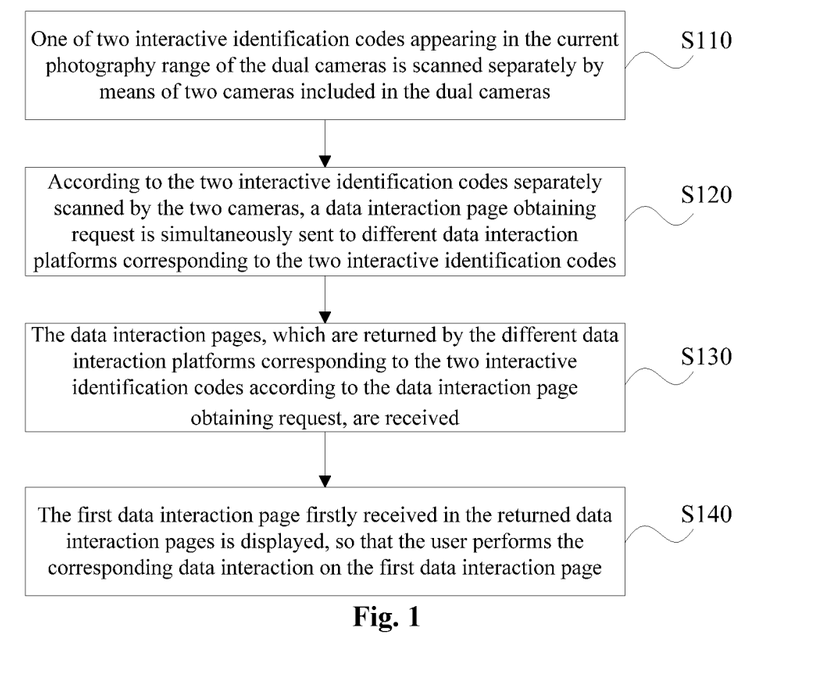
FIG. 1 is a schematic diagram of embodiments of a data interaction method provided by the present disclosure.

FIG. 1 is a schematic diagram of embodiments of a data interaction method provided by the present disclosure. As shown in FIG. 1, according to embodiments of the present disclosure, the data interaction method at least includes S110, S120, S130 and S140.

At S110, one of two interactive identification codes appearing in the current photography range of the dual cameras is scanned separately by means of two cameras included in the dual cameras.

The interactive identification code may be specifically used for data interaction based on a specific data interaction platform; for example, a payment transaction based on a payment platform. The interactive identification code may include URL of a data interaction page. The interactive identification code may be, for example, a QR code. When the QR code is scanned, the QR code is identified to identify the corresponding URL so as to initiate data interactions, such as payment and transfer, to the corresponding data interaction platform according to the URL, and then a data interaction page provided by the corresponding data interaction platform is displayed, and a user may complete the corresponding data interactions, such as payment and transfer, on the data interaction page. The two interactive identification codes in the current photography range respectively correspond to different data interaction platforms, such as WeChat pay platform and Alipay. For example, most merchants provide more than two scanning payment methods and display the QR codes of more than two payment methods at the same time. For example, the QR code of WeChat pay or the QR code of Alipay is displayed at the same time.

In some embodiments of the disclosure, in a specific implementation mode, the two cameras are made to scan an image in the current photography range from different directions, so that the two cameras can scan different interactive identification codes in the two interactive identification codes. The current photography range is specifically the scene currently appearing on the screen of the mobile terminal. The different directions may specifically be two opposite directions. For example, in the case of portrait display of the mobile terminal, one of the two cameras scans from top to bottom of the screen of the mobile terminal, and the other scans from bottom to top of the screen of the mobile terminal; or, taking the center line of the screen as the common starting point of scanning, one camera scans up and the other camera scans down. Or, in the case of landscape display of the mobile terminal, one of the two cameras scans from the left to the right of the screen of the mobile terminal, and the other scans from the right to the left of the screen of the mobile terminal; or, taking the center line of the screen as the common starting point of scanning, one camera scans from the left and the other camera scans from the right.

In another specific implementation mode, scanning boxes corresponding to the two cameras are separately displayed on a touch screen of the mobile terminal; a touch and drag operation performed on the touch screen by a user to the scanning box corresponding to at least one of the two cameras is received; and after the touch and drag operation stops, the interactive identification code appearing in the scanning box is scanned through the corresponding camera.

In some embodiments of the disclosure, the scanning boxes corresponding to the two cameras are separately displayed on the touch screen of the mobile terminal, the user may drag the scanning box corresponding to any camera to make the scanning box corresponding to the camera aim at the interactive identification code to be scanned. After the drag operation stops, if a QR code is detected in the scanning box, the system scans the appearing QR code immediately to identify the corresponding URL, and then sends a data interaction request to the corresponding data interaction platform according to the URL.

For example, two scanning boxes are displayed on the screen of a mobile phone, and the shape of the scanning box is the same as the shape of the QR code shape, namely a square; when using the mobile phone to scan the QR code provided by the merchant, the user moves the mobile phone to make the QR code appear in the scanning box on the screen; for example, when a scanning box already aims at a QR code, the user may manually drag another scanning box to aim at another QR code. If pattern information of two QR codes cannot be collected at the same time, the user may manually correct the scanning box of one of the cameras to the other QR code without collected information on the premise that a QR code may be identified normally.

At S120, according to the two interactive identification codes separately scanned by the two cameras, a data interaction page obtaining request is simultaneously sent to different data interaction platforms corresponding to the two interactive identification codes.

In some embodiments of the present disclosure, after the two interactive identification codes are scanned by means of the two cameras, the two interactive identification codes are identified to obtain information contained in the two interactive identification codes, and then the data interaction page obtaining request is sent to the corresponding data interaction platform according to the information contained in the interactive identification code. The information contained in the interactive identification code may specifically include the URL of the data interaction page. The interactive identification code may be, for example, the QR code. For example, when any one of the cameras scans the QR code, the scanned QR code is identified to identity the corresponding URL, and then the data interaction page obtaining request is sent to the corresponding data interaction platform according to the URL, such as payment and transfer.

At S130, the data interaction pages, which are returned by the different data interaction platforms corresponding to the two interactive identification codes according to the data interaction page obtaining request, are received.

In some embodiments of the disclosure, after the first data interaction page returned by any one of the different data interaction platforms corresponding to the two interactive identification codes is received, a second data interaction page returned by another of the different data interaction platforms corresponding to the two interactive identification codes is no longer received. For example, when the user pays to the merchant, two payment QR codes provided by the merchant are scanned simultaneously through two cameras respectively, and a payment page obtaining request is simultaneously sent to the payment platforms corresponding to the two payment QR codes. Which payment platform first feeds back the payment page to the mobile terminal (that is, the server of which payment platform responds faster), the payment page received first is displayed on the mobile terminal, and after the payment platform fed back by the payment platform first feeding back, the payment platform fed back by another payment platform is no longer received. For example, the QR code of WeChat pay and the QR code of Alipay are respectively scanned by means of the dual cameras; if the payment page returned by the WeChat pay platform is first received, then the payment page returned by the Alipay platform is no longer received.

At S140, the first data interaction page firstly received in the returned data interaction pages is displayed, so that the user performs the corresponding data interaction on the first data interaction page.

The data interaction pages may specifically include: data receiver information, data input area, validation password input area, confirm button, etc. The user may input data to be interacted in the data input area of the data interaction page, for example, amount to be paid. The user may input a validation password in the validation password input area, for example, a payment code. After pressing the confirm button, the user initiates data interaction to the corresponding data interaction platform, for example, a payment operation initiated to the payment platform.

In some embodiments of the disclosure, after the first data interaction page firstly received in the returned data interaction pages is displayed, the second data interaction page later received in the returned data interaction pages is no longer displayed. For example, if the QR code of WeChat pay and the QR code of Alipay are respectively scanned by means of the dual cameras, and the payment page returned by the WeChat pay platform is first received, the payment page of WeChat pay is displayed, and the payment page of Alipay is no longer displayed, which may prevent the user from repeating the data interaction and avoid property loss caused by user's wrong operation.

Figure 2:
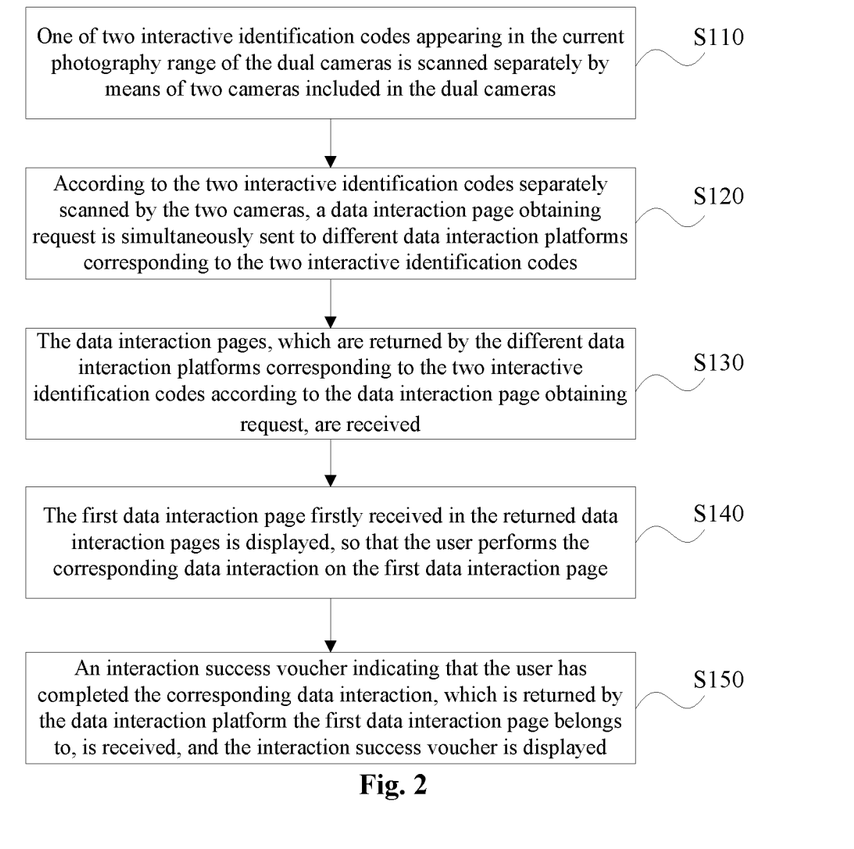
FIG. 2 is a schematic diagram of other embodiments of a data interaction method provided by the present disclosure.

FIG. 2 is a schematic diagram of other embodiments of a data interaction method provided by the present disclosure. As shown in FIG. 2, based on the above embodiments, according to other embodiments of the present disclosure, the data interaction method at least includes S110, S120, S130, S140 and S150.

At S150, an interaction success voucher indicating that the user has completed the corresponding data interaction, which is returned by the data interaction platform the first data interaction page belongs to, is received and the interaction success voucher is displayed.

For example, a payment voucher indicating that the user pays successfully returned by the payment platform is received, and the payment voucher is displayed on the terminal.

In order to clearly illustrate the technical solutions of the present disclosure, an execution flow of the data interaction method used for the mobile terminal provided by the present disclosure is described with a specific embodiment. The embodiments are illustrated by taking payment for example, and the flow may refer to FIG. 3.

Figure 3:
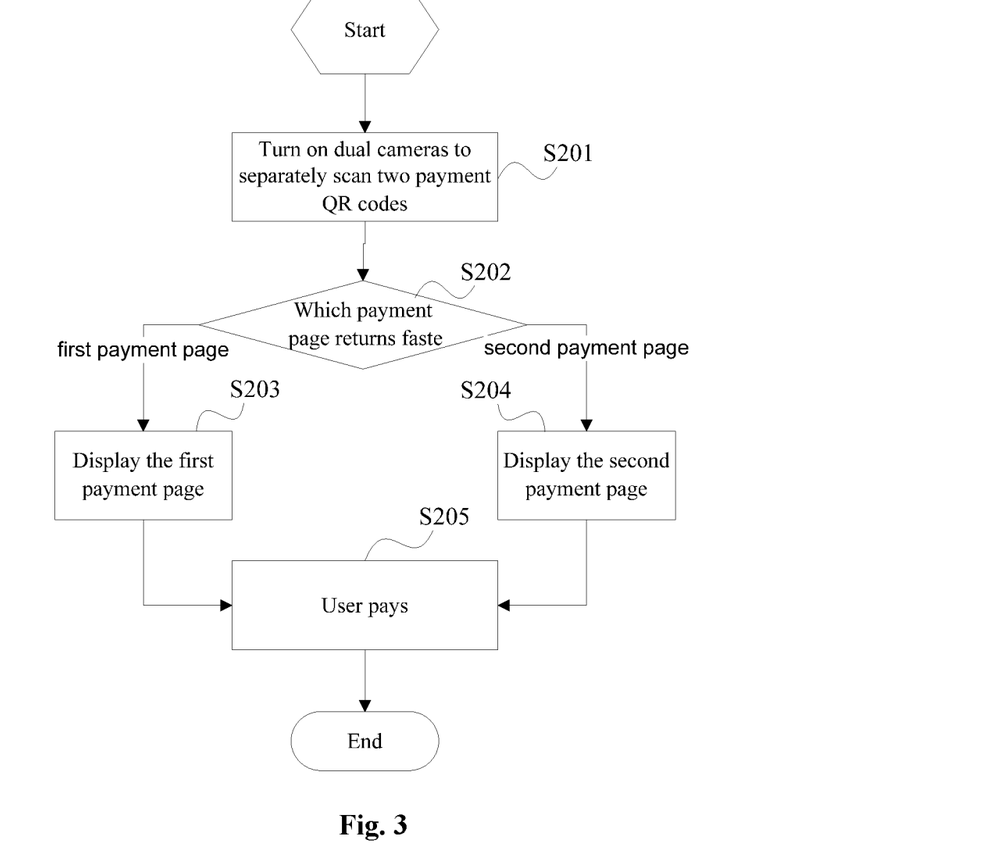
FIG. 3 is a schematic diagram of specific embodiments of a data interaction method provided by the present disclosure.

FIG. 3 is a schematic diagram of specific embodiments of a data interaction method provided by the present disclosure. The embodiments shown in FIG. 3 include S201 to S205.

At S201, the payment QR codes corresponding to two payment methods are respectively scanned by means of the dual cameras.

At S202, the payment pages returned by two corresponding payment platforms are received, and the corresponding payment page of the payment platform will be displayed if the payment platform returns the payment page faster.

At S203, if the first payment page returns faster, the first payment page is displayed.

At S204, if the second payment page returns faster, the second payment page is displayed.

At S205, the user pays on the displayed payment page.

Figure 4:
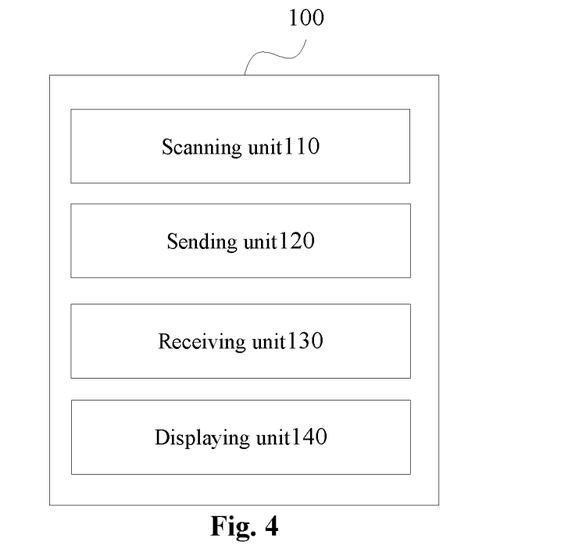
FIG. 4 is a structure diagram of embodiments of a data interaction device provided by the present disclosure.

The present disclosure also provides a data interaction device used for a mobile terminal. The mobile terminal includes dual cameras. FIG. 4 is a structure diagram of embodiments of a data interaction device provided by the present disclosure. As shown in FIG. 4, the data interaction device 100 includes: a scanning unit 110, a sending unit 120, a receiving unit 130 and a displaying unit 140.

The scanning unit 110 is configured to separately scan one of the two interactive identification codes appearing in the current photography range of the dual cameras by means of two cameras included in the dual cameras, the two interactive identification code respectively corresponding to different data interaction platforms. The sending unit 120 is configured to send the data interaction page obtaining request to the different data interaction platforms corresponding to the two interactive identification codes according to the two interactive identification codes separately scanned by the two cameras. The receiving unit 130 is configured to receive the data interaction pages, which are returned by the different data interaction platforms corresponding to the two interactive identification codes according to the data interaction page obtaining request. The displaying unit 140 is configured to display the first data interaction page firstly received in the returned data interaction pages, so that the user performs corresponding data interaction on the first data interaction page.

The interactive identification code may be specifically used for data interaction based on the specific data interaction platform; for example, a payment transaction based on a payment platform. The interactive identification code may specifically include the URL of the data interaction page. The interactive identification code may be, for example, the QR code. When the QR code is scanned, the QR code is identified to identify the corresponding URL so as to initiate the data interactions, such as payment and transfer, to the corresponding data interaction platform according to the URL, and then the data interaction page provided by the corresponding data interaction platform is displayed, and the user may complete the corresponding data interactions, such as payment and transfer, on the data interaction page. The two interactive identification codes in the current photography range respectively correspond to different data interaction platforms, such as WeChat pay platform and Alipay. At present, most merchants provide more than two scanning payment methods and display the QR codes of more than two payment methods at the same time. For example, the QR code of WeChat payment or the QR code of Alipay is displayed at the same time.

In some embodiments of the disclosure, in a specific implementation mode, the scanning unit 110 makes the two cameras scan the image in the current photography range from different directions, so that the two cameras can scan different interactive identification codes in the two interactive identification codes. The current photography range is specifically the scene currently appearing on the screen of the mobile terminal. The different directions may specifically be two opposite directions. For example, in the case of portrait display of the mobile terminal, one of the two cameras scans from top to bottom of the screen of the mobile terminal, and the other scans from bottom to top of the screen of the mobile terminal; or, taking the center line of the screen as the common starting point of scanning, one camera scans up and the other camera scans down. Or, in the case of landscape display of the mobile terminal, one of the two cameras scans from the left to the right of the screen of the mobile terminal, and the other scans from the right to the left of the screen of the mobile terminal; or, taking the center line of the screen as the common starting point of scanning, one camera scans from the left and the other camera scans from the right.

In another specific implementation mode, the scanning unit 110 separately displays the scanning boxes corresponding to the two cameras on a touch screen of the mobile terminal, receives the touch and drag operation performed on the touch screen by the user to the scanning box corresponding to at least one of the two cameras, and after the touch and drag operation stops, scans the interactive identification code appearing in the scanning box through the corresponding camera.

In some embodiments of the disclosure, the scanning boxes corresponding to the two cameras are separately displayed on the touch screen of the mobile terminal, the user may drag the scanning box corresponding to any camera to make the scanning box corresponding to the camera aim at the interactive identification code to be scanned. After the drag operation stops, if a QR code is detected in the scanning box, the system scans the appearing QR code immediately to identify the corresponding URL, and then sends a data interaction request to the corresponding data interaction platform according to the URL.

For example, two scanning boxes are displayed on the screen of the mobile phone, and the shape of the scanning box is the same as the shape of the QR code shape, namely a square; when using the mobile phone to scan the QR code provided by the merchant, the user moves the mobile phone to make the QR code appear in the scanning box on the screen; for example, when a scanning box already aims at a QR code, the user may manually drag another scanning box to aim at another QR code. If the pattern information of two QR codes cannot be collected at the same time, the user may manually correct the scanning box of one of the cameras to the other QR code without collected information on the premise that a QR code may be identified normally.

The sending unit 120 sends, according to the two interactive identification codes separately scanned by the two cameras, the data interaction page obtaining request simultaneously to the different data interaction platforms corresponding to the two interactive identification codes.

In some embodiments of the disclosure, after scanning the two interactive identification codes by means of the two cameras, the scanning unit 110 identifies the two interactive identification codes to obtain the information contained in the two interactive identification codes, and then the sending unit 120 sends the data interaction page obtaining request to the corresponding data interaction platform according to the information contained in the interactive identification code. The information contained in the interactive identification code may specifically include the URL of the data interaction page. The interactive identification code may be, for example, the QR code. For example, when any one of the cameras scans the QR code, the scanned QR code is identified to identity the corresponding URL, and then the sending unit 120 sends the data interaction page obtaining request to the corresponding data interaction platform according to the URL, such as payment and transfer.

The receiving unit 130 receives the data interaction pages, which are returned by the different data interaction platforms corresponding to the two interactive identification codes according to the data interaction page obtaining request. In some embodiments of the disclosure, after first receiving the first data interaction page returned by any one of the different data interaction platforms corresponding to the two interactive identification codes, the receiving unit 130 does not receive the second data interaction page returned by another of the different data interaction platforms corresponding to the two interactive identification codes any more. For example, when the user pays to the merchant, two payment QR codes provided by the merchant are scanned simultaneously through two cameras respectively, and a payment page obtaining request is simultaneously sent to the payment platforms corresponding to the two payment QR codes. Which payment platform first feeds back the payment page to the mobile terminal (that is, the server of which payment platform responds faster), the payment page received first is displayed on the mobile terminal, and after the payment platform fed back by the payment platform first feeding back, the payment platform fed back by another payment platform is no longer received. For example, the QR code of WeChat pay and the QR code of Alipay are respectively scanned by means of the dual cameras; if the payment page returned by the WeChat pay platform is first received, then the payment page returned by the Alipay platform is no longer received.

The displaying unit 140 displays the first data interaction page firstly received in the returned data interaction pages received by the receiving unit 130. The data interaction pages may specifically include: the data receiver information, the data input area, the validation password input area, the confirm button, etc. The user may input the data to be interacted in the data input area of the data interaction page, for example, the amount to be paid. The user may input the validation password in the validation password input area, for example, the payment code. After pressing the confirm button, the user initiates the data interaction to the corresponding data interaction platform, for example, the payment operation initiated to the payment platform.

In some embodiments of the disclosure, after displaying the first data interaction page firstly received in the returned data interaction pages, the displaying unit 140 does not display the second data interaction page later received in the returned data interaction pages any more. For example, if the QR code of WeChat pay and the QR code of Alipay are respectively scanned by means of the dual cameras, and the payment page returned by the WeChat pay platform is first received, the payment page of WeChat pay is displayed, and the payment page of Alipay is no longer displayed, which may prevent the user from repeating the data interaction and avoid property loss caused by user's wrong operation.

Figure 5:
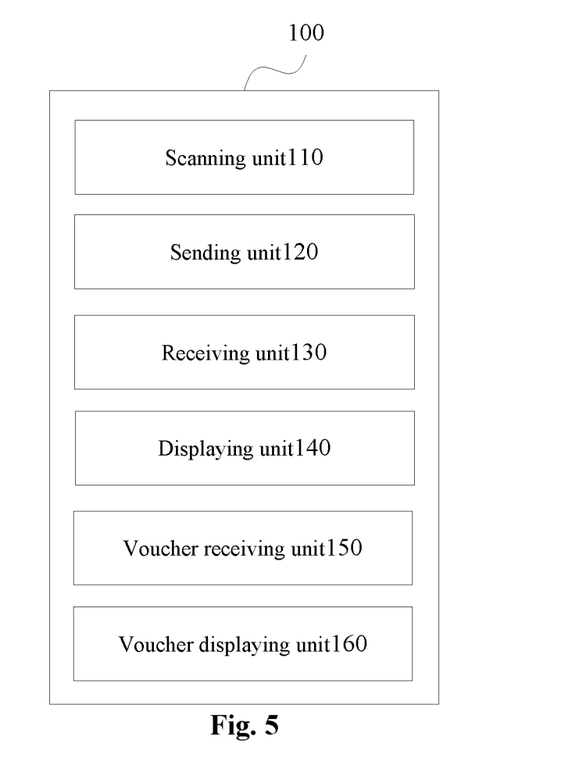
FIG. 5 is a structure diagram of other embodiments of a data interaction device provided by the present disclosure.

FIG. 5 is a structure diagram of other embodiments of a data interaction device provided by the present disclosure. As shown in FIG. 5, the data interaction device 100 includes: the scanning unit 110, the sending unit 120, the receiving unit 130 and the displaying unit 140. The data interaction device 100 further includes a voucher receiving unit 150 and a voucher displaying unit 160.

The voucher receiving unit 150 is configured to receive the interaction success voucher indicating that the user has completed the corresponding data interaction, which is returned by the data interaction platform the first data interaction page belongs to. The voucher displaying unit 160 is configured to display the interaction success voucher received by the voucher receiving unit. For example, the voucher receiving unit 150 receives a payment voucher indicating that the user pays successfully returned by the payment platform, and the voucher displaying unit 160 displays the payment voucher on the terminal.

The present disclosure also provides a storage medium corresponding to the data interaction method, storing a computer program thereon. When executed by a processor, the program implements steps of any above data interaction method.

The present disclosure also provides a mobile terminal corresponding to the data interaction method, which includes dual cameras. The mobile terminal further includes a processor, a memory, and a computer program stored on the memory and capable of running on the processor. When executing the program, the processor implements steps of any above data interaction method.

The present disclosure also provides a mobile terminal corresponding to the data interaction device used for a mobile terminal. The mobile terminal includes dual cameras, and further includes any above data interaction device.

According to the embodiments provided by the present disclosure, during data interaction, one of the two interactive identification codes appearing in the current photography range of the dual cameras is scanned separately by means of two cameras included in the dual cameras, the data interaction page obtaining request is simultaneously sent to the different data interaction platforms corresponding to the two interactive identification codes, and the first data interaction page firstly received which is returned by the data interaction platform is displayed so that the user performs corresponding data interaction on the first data interaction page, that is, the platform with the faster feedback speed corresponding to one of the two interactive identification codes is used, so there is no need for the user to select the data interaction approach purposely, which is easy to operate, saves time and improves user experience.

The functions described in the specification may be implemented in hardware, software executed by the processor, firmware or any combination thereof. When implemented in the software executed by the processor, these functions may be stored in a computer-readable medium or transmitted through the computer-readable medium as one or more instructions or codes. Other examples and implementation solutions fall within the scope and spirit of the present disclosure and the attached claims. For example, attributing to the nature of software, the functions described above can be implemented by the software executed by processors, hardware, firmware, hardwires or any combination of them. Moreover, all the function units may be integrated in a processing unit; or the units exist separately and physically; or two or more than two units are integrated in a unit.

In the several embodiments provided in the disclosure, it should be understood that the technical contents disclosed may be realized in other ways. The embodiments of the device described above are only schematics; for example, the division of the units is only a division of logical functions, and there may be other dividing modes during the actual implementation, for example, multiple units or components may be combined or integrated to another system, or some features may be ignored or are not executed. In addition, coupling, direct coupling, or communication connection shown or discussed may be implemented through indirect coupling or communication connection of some interfaces, units or modules, and may be in an electrical form or other forms.

The units described as separate parts may be or may not be separate physically. The part as a control device may be or may not be a physical unit, that is to say, it may be in a place or distributed on multiple network units. Part or all of the units may be selected to achieve the purpose of the solutions of the embodiments according to a practical requirement.

If the integrated unit is implemented by software function modules, and the software function modules are sold or used as independent products, they can also be stored in a computer readable storage medium. Based on this understanding, the technical solution of the embodiments of the present disclosure substantially or the part making a contribution to the related art can be embodied in the form of software product; the computer software product is stored in a storage medium, and includes a number of instructions to make a computer device (which may be a personal computer, a server or a network device, etc.) perform all or part of steps of the method in embodiments of the present disclosure. The storage media include, but not limited to, a USB flash disk, a Read-Only Memory (ROM), a Random Access Memory (RAM), a mobile hard disk, a magnetic disk, a compact disc, and other media capable of storing the program codes.

The above is only the embodiments of the present disclosure and not intended to limit the present disclosure; for those skilled in the art, the present disclosure may have various modifications and changes. Any modifications, equivalent replacements, improvements and the like within the spirit and principle of the present disclosure should fall within the scope of the claims of the present disclosure.

What is claimed is:

1. A data interaction method used for a mobile terminal, wherein the mobile terminal comprises dual cameras; the method comprises:
    separately scanning one of two interactive identification codes appearing in a current photography range of the dual cameras by means of two cameras included in the dual cameras, the two interactive identification code respectively corresponding to different data interaction platforms;
    simultaneously sending a data interaction page obtaining request to the different data interaction platforms corresponding to the two interactive identification codes according to the two interactive identification codes separately scanned by the two cameras;
    receiving data interaction pages, which are returned by the different data interaction platforms corresponding to the two interactive identification codes according to the data interaction page obtaining request; and
    displaying a first data interaction page firstly received in the returned data interaction pages, so that a user performs corresponding data interaction on the first data interaction page;
    wherein separately scanning one of the two interactive identification codes appearing in the current photography range of the dual cameras by means of the two cameras included in the dual cameras comprises:
    separately displaying scanning boxes corresponding to the two cameras on a touch screen of the mobile terminal;
    receiving a touch and drag operation performed on the touch screen by a user to the scanning box corresponding to at least one of the two cameras; and
    after the touch and drag operation stops, scanning, through the corresponding camera, the interactive identification code appearing in the scanning box.

2. The method as claimed in claim 1, wherein receiving the data interaction pages, which are returned by the different data interaction platforms corresponding to the two interactive identification codes according to the data interaction page obtaining request comprises:
    after receiving the first data interaction page returned by any one of the different data interaction platforms corresponding to the two interactive identification codes, no longer receiving a second data interaction page returned by another of the different data interaction platforms corresponding to the two interactive identification codes.

3. The method as claimed in claim 2, wherein separately scanning one of the two interactive identification codes appearing in the current photography range of the dual cameras by means of the two cameras included in the dual cameras comprises:
    separately displaying scanning boxes corresponding to the two cameras on a touch screen of the mobile terminal;
    receiving a touch and drag operation performed on the touch screen by a user to the scanning box corresponding to at least one of the two cameras; and
    after the touch and drag operation stops, scanning, through the corresponding camera, the interactive identification code appearing in the scanning box.

4. The method as claimed in claim 2, further comprising:
    receiving an interaction success voucher indicating that the user has completed the corresponding data interaction, which is returned by the data interaction platform the first data interaction page belongs to, and displaying the interaction success voucher.

5. The method as claimed in claim 1, wherein displaying the first data interaction page firstly received in the returned data interaction pages comprises:
    after displaying the first data interaction page firstly received in the returned data interaction pages, no longer displaying the second data interaction page received later in the returned data interaction pages.

6. The method as claimed in claim 5, further comprising:
    receiving an interaction success voucher indicating that the user has completed the corresponding data interaction, which is returned by the data interaction platform the first data interaction page belongs to, and displaying the interaction success voucher.

7. The method as claimed in claim 1, wherein separately scanning one of the two interactive identification codes appearing in the current photography range of the dual cameras by means of the two cameras included in the dual cameras comprises:
making the two cameras scan an image in the current photography range from different directions, so that the two cameras can scan different interactive identification codes in the two interactive identification codes.

8. The method as claimed in claim 7, wherein the different directions comprises: two opposite directions.

9. The method as claimed in claim 1, further comprising:
receiving an interaction success voucher indicating that the user has completed the corresponding data interaction, which is returned by the data interaction platform the first data interaction page belongs to, and displaying the interaction success voucher.

10. The method as claimed in claim 1, wherein the current photography range is a scene currently appearing on the screen of the mobile terminal.. The different directions may specifically be two opposite directions.

11. A mobile terminal, comprising dual cameras, a processor, a memory, and a computer program stored on the memory and capable of running on the processor;
wherein the dual cameras are configured to separately scan one of two interactive identification codes appearing in a current photography range of the dual cameras by means of two cameras included in the dual cameras, the two interactive identification code respectively corresponding to different data interaction platforms;
when executing the program, the processor implements the following steps:
sending a data interaction page obtaining request to the different data interaction platforms corresponding to the two interactive identification codes according to the two interactive identification codes separately scanned by the two cameras;
receiving data interaction pages, which are returned by the different data interaction platforms corresponding to the two interactive identification codes according to the data interaction page obtaining request; and a displaying unit, configured to display a first data interaction page firstly received in the returned data interaction pages, so that a user performs corresponding data interaction on the first data interaction page;
the dual cameras are further configured to separately display scanning boxes corresponding to the two cameras on a touch screen of the mobile terminal, receive a touch and drag operation performed on the touch screen by a user to the scanning box corresponding to at least one of the two cameras, and after the touch and drag operation stops, scan, through the corresponding cameras, the interactive identification code appearing in the scanning box.

12. The mobile terminal as claimed in claim 11, wherein the processor further implements the following steps;
after receiving the first data interaction page returned by any one of the different data interaction platforms corresponding to the two interactive identification codes, no longer receiving a second data interaction page returned by another of the different data interaction platforms corresponding to the two interactive identification codes.

13. The mobile terminal as claimed in claim 12, the scanning unit is configured to make the two cameras scan an image in the current photography range from different directions, so that the two cameras can scan different interactive identification codes in the two interactive identification codes.

14. The mobile terminal as claimed in claim 12, wherein the scanning unit is further configured to separately display scanning boxes corresponding to the two cameras on a touch screen of the mobile terminal; receive a touch and drag operation performed on the touch screen by a user to the scanning box corresponding to at least one of the two cameras; and after the touch and drag operation stops, scan, through the corresponding camera, the interactive identification code appearing in the scanning box.

15. The mobile terminal as claimed in claim 11, wherein the processor further implements the following steps:
after displaying the first data interaction page firstly received in the returned data interaction pages, no longer display the second data interaction page received later in the returned data interaction pages.

16. The mobile terminal as claimed in claim 11, the scanning unit is configured to make the two cameras scan an image in the current photography range from different directions, so that the two cameras can scan different interactive identification codes in the two interactive identification codes.

17. The mobile terminal as claimed in claim 11, wherein the processor further implements the following steps; separately display scanning boxes corresponding to the two cameras on a touch screen of the mobile terminal; receive a touch and drag operation performed on the touch screen by a user to the scanning box corresponding to at least one of the two cameras; and after the touch and drag operation stops, scan, through the corresponding camera, the interactive identification code appearing in the scanning box.

18. The mobile terminal as claimed in claim 11, the processor further implements the following steps:
receiving an interaction success voucher indicating that the user has completed the corresponding data interaction, which is returned by the data interaction platform the first data interaction page belongs to; and
displaying the interaction success voucher received by the voucher receiving unit.

19. A non-transitory storage medium, storing a computer program thereon, and the program implementing, when being executed by a processor, the following steps;
separately scanning one of two interactive identification codes appearing in a current photography range of the dual cameras by means of two cameras included in the dual cameras, the two interactive identification code respectively corresponding to different data interaction platforms;
simultaneously sending a data interaction page obtaining request to the different data interaction platforms corresponding to the two interactive identification codes according to the two interactive identification codes separately scanned by the two cameras;
receiving data interaction pages, which are returned by the different data interaction platforms corresponding to the two interactive identification codes according to the data interaction page obtaining request; and
displaying a first data interaction page firstly received in the returned data interaction pages, so that a user performs corresponding data interaction on the first data interaction page;
wherein separately scanning one of the two interactive identification codes appearing in the current photography range of the dual cameras by means of the two cameras included in the dual cameras comprises:

separately displaying scanning boxes corresponding to the two cameras on a touch screen of the mobile terminal;

receiving a touch and drag operation performed on the touch screen by a user to the scanning box corresponding to at least one of the two cameras; and after the touch and drag operation stops, scanning, through the corresponding camera, the interactive identification code appearing in the scanning box.

* * * * *